Aug. 21, 1923.
H. L. THOMSON
1,465,498
METHOD OF AND APPARATUS FOR REGISTERING THE TIME WHEN RECORD ENTRIES ARE MADE
Filed Dec. 31, 1920
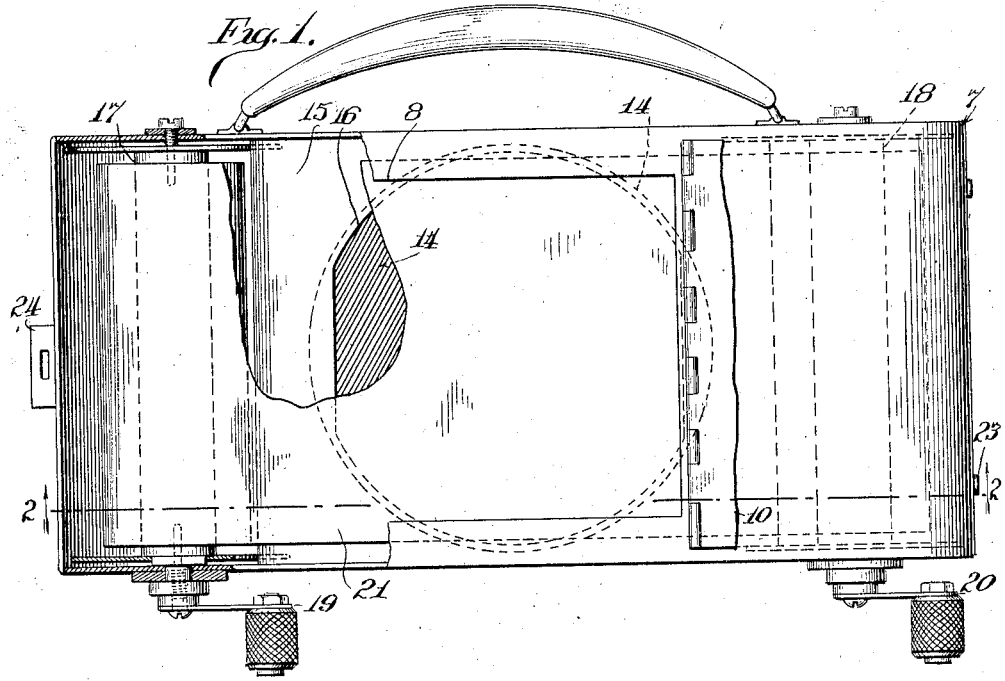
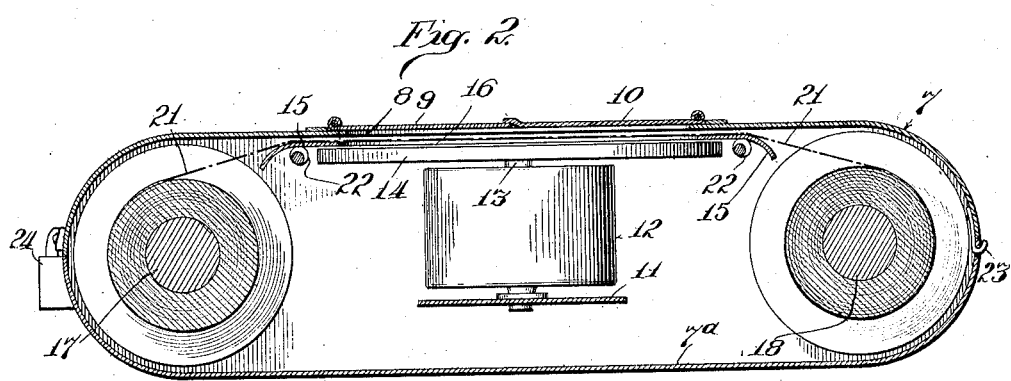
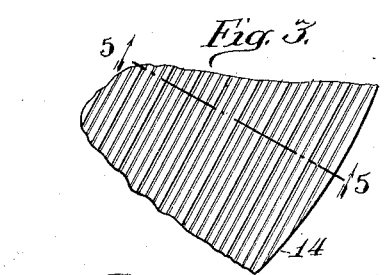
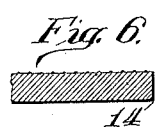
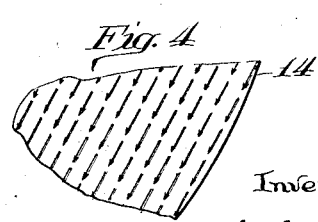

Patented Aug. 21, 1923.

1,465,498

UNITED STATES PATENT OFFICE.

HARRY L. THOMSON, OF HARTFORD, CONNECTICUT.

METHOD OF AND APPARATUS FOR REGISTERING THE TIME WHEN RECORD ENTRIES ARE MADE.

Application filed December 31, 1920. Serial No. 434,199.

*To all whom it may concern:*

Be it known that I, HARRY L. THOMSON, a citizen of the United States, and a resident of Hartford, in the county of Hartford and State of Connecticut, have invented a certain new and Improved Method of and Apparatus for Registering the Time When Record Entries are Made, of which the following is a specification, reference being had to the accompanying drawings.

My invention has to do with the recording of the time when printed, written, or similar entries are made, in such manner that the indication of the time will be inevitably and inseparably associated with the record entry. The matter of preserving a record of the time when entries are made is of great importance, as, for example, in connection with the receipt or delivery of telegrams, registered or special delivery mail, or express matter, telephone calls, military or naval orders, entries in logs or journals, hotel or other registers, telegraph, or other automatic or distance writing machines, time record clocks for factories and offices, etc., watchmen's systems, fire and burglar alarm systems, the reading of gas, electric, water, and other meters, etc. The practical advantages of preserving a thoroughly reliable record of the time when such entries are made are well understood by most persons, and, therefore, they need not be pointed out here, and many devices for the purpose have heretofore been produced with varying degrees of success. Nevertheless a demand exists for a simple and accurate method of registering the time when record entries are made which may conveniently be used in many situations where existing devices cannot be satisfactorily employed, and to supply this demand is the object of my present invention. This object I accomplish as illustrated in the drawings and as hereinafter described. What I regard as new is set forth in the claims.

In the accompanying drawings I have illustrated my improved apparatus applied to an instrument designed primarily for receiving record entries of gas, electric, or similar meters, as in that field particularly there is a pressing demand for such an apparatus. It will be understood, however, that in so illustrating my invention I have not intended to restrict it to that field, as I contemplate employing it for any and all uses to which it may be adapted.

In the drawings,—

Fig. 1 is a plan view of a portable recording apparatus designed for the use of meter readers, some parts being broken away to show its interior construction;

Fig. 2 is a longitudinal vertical section on line 2—2 of Fig. 1;

Figs. 3 and 4 are very much enlarged fragmentary views of the upper surface of a platen which forms a part of the apparatus, showing different designs that may be used;

Fig. 5 is a partial vertical section on line 5—5 of Fig. 3; and

Fig. 6 is a similar view showing a modified contour of the upper surface of the platen.

Referring to the drawings,—7 indicates a case which may be similar in design to the case of an ordinary amateur photographic camera. The front or top of the case is provided with an opening 8, preferably rectangular in outline, over which opening extend hinged covers or doors 9, 10, adapted to be folded back to expose said opening. In Fig. 2 these doors are shown closed. Arranged centrally below the opening 8 and supported in any suitable way, as by a plate 11 secured to the side walls of the case 7, is a chronometer 12 having a central arbor 13 which, instead of the usual hands, carries a circular disc or platen 14, as best shown in Fig. 2. This platen is supported parallel with the upper portion of the case 7 and a short distance below it, and underlies the opening 8. The upper surface of the platen is provided in any suitable way, as by engraving, embossing, etc., with a series of straight parallel reproducible directional symbols, such as lines, arrows, etc., these symbols being arranged to cover the entire operating surface of the platen, as indicated in Fig. 1. In Fig. 3 I have shown a portion of a platen marked with a series of direction symbols consisting of grooves of different depths, the darker lines indicating the deeper grooves. In Fig. 4 I have shown the directional symbols as formed by a series of engraved or embossed arrows arranged in broken lines, and in Fig. 6 I have shown the platen provided with a series of ridges which may be either continuous or broken.

These illustrations will serve to point out the general character of the symbols to be employed, although obviously various other designs can be used. The manner in which these directional symbols indicate the time when entries are made will be explained later.

Arranged above the platen 14 and between it and the end surface of the case 7 is a guide plate 15, the ends of which are curved inwardly as shown in Fig. 2, and the central portion of which is cut away to form an opening 16 as also shown in Fig. 2. Preferably this opening is in the main circular in outline, and is slightly less in diameter than the platen 14, as indicated by the dotted line in Fig. 1. 17, 18 indicate two reels which are mounted in the end portions of the case 7, as shown in Fig. 2, and are arranged to be rotated by cranks 19, 20 respectively. The specific manner in which these reels are mounted is immaterial, as all that is necessary is that they be capable of being rotated freely, and preferably in either direction. 21 indicates a web of paper adapted to be wound upon the reels 17, 18, and of suitable width to extend across the opening 16 in the guide plate 15. The leading end of a web roll is mounted upon one of the reels, as 18, and is threaded over the plate 15 and attached to the opposite roll as 17, and consequently by rotating the crank 19 it may be drawn over the platen 14 and wound upon the roll 17, or, if desired, after the web has been partly wound on the roll 17 it may be reversed and be rewound on the roll 18. It will be noted that the plate 15 serves to hold the paper normally out of contact with the platen 14, but by pressing down on the paper, as when a writing is made upon it, it will engage and bear upon the surface of the platen. Evidently, therefore, whenever the exposed portion of the paper is written upon, the pressure of the pen, pencil, stylus, or other writing instrument operating over the figured surface of the platen will cause the written record to show a reproduction of the directional symbols carried by the platen. That is to say, the act of making the record entry will mark it with, what, for want of a better term, may be said to be lines in relief, which lines will be inseparably associated with the entry. Inasmuch as the platen is rotated by the chronometer, the angle formed by the direction symbols carried by it with a constant base line, as for example the line of movement of the paper over the platen, is constantly changing, and by measuring such angle and comparing it with the angle formed with such line at any predetermined hour such as noon, the exact time when any entry is made can be obtained with a great degree of accuracy. By causing the platen to rotate once every twenty four hours the time when any entry is made during that interval will be indicated, but for ordinary purposes a twelve hour period of rotation will suffice. An important advantage of the apparatus illustrated is that the time when any entry is made is properly indicated no matter where on the exposed portion of the paper the entry is made, as the directional lines form the same angle at all parts of the platen. Also if the paper be reversed and moved back instead of forward, whenever an entry is made the time will be properly shown. It is impossible, therefore, by manipulating the paper to avoid recording the time when any entry is made.

In some cases it is desirable to provide means for emphasizing the directional lines produced on the sheet, and this may be accomplished by inserting a sheet of impression paper between the upper surface of the platen and the guide plate 15, arranged so that the under surface of the paper roll will take the imprint of the impression paper when a writing is made. For this purpose I prefer to provide cam-shaped clamps 22 adjacent to the ends of the guide plate 15, as shown in Fig. 2, which serve to clamp the impression paper against the under side of said plate. When the impression paper is used, the directional lines or symbols are reproduced on the under side of the paper 21, together with the reproduction of the record entry.

The reels 17, 18 may, if desired, be made removable, but that is not necessary as it is a simple matter to wind a roll of web on either of the reels and then thread it across the platen, to be rewound on the other reel. As it is necessary to have access to the interior of the case 7 to renew or remove the paper, and for other purposes, the back or lower side 7ª of the case is made removable. This may be accomplished in any suitable way, but I prefer to form the case of two members connected at one end by a hook 23, and locked together at the other end by any suitable lock, such as a padlock 24. By this arrangement access to the interior of the case by unauthorized parties is prevented.

As will be appreciated from the foregoing description, my improved apparatus is very simple and compact, so that it is well adapted for the use of meter readers, messengers, etc., and it is entirely reliable, as its successful operation depends only upon the reliability of the chronometer.

What I claim as my invention and desire to secure by Letters Patent, is,—

1. The method of registering the time when record entries are made, which consists in varying the appearance of entries made at different times by inseparably incorporating therewith by the act of making such entries distinguishing characteristics indicative of the times when such entries are made and independent of the subject-matter composing such entries.

2. The method of registering the time when record entries are made which consists in incorporating with each entry by the act of making the same a chronometrically controlled directional symbol, the angle of which to a constant base line indicates the time of such entry.

3. The method of registering the time when record entries are made which consists in incorporating in relief with an entry made on a record sheet by the act of making of such entry thereon a chronometrically controlled directional symbol, the angle of which to a constant base line indicates the time of making such entry.

4. The method of registering the time when record entries are made which consists in impressing a time indicating character on a record sheet and incorporating it in the entry by the act of making an entry thereon.

5. An apparatus for registering the time when record entries are made comprising chronometrically controlled means operated by the act of making a record on a record sheet to impress on said sheet and incorporate in the record a time indicating character.

6. An apparatus for registering the time when record entries are made comprising chronometrically controlled means adapted to be associated with a record sheet and to cooperate with a record making instrument while the same is making a record on such sheet to integrally incorporate in the matter so recorded marks indicative of the time when such record is made.

7. An apparatus for registering the time when record entries are made comprising chronometrically controlled means adapted to be associated with a record sheet and operated by the act of making a record on such sheet to incorporate with such record directional symbols indicative of the time when such record is made.

8. An apparatus for registering the time when record entries are made comprising a chronometrically controlled rotary platen adapted to be associated with a record sheet and operated by the act of making a record on such sheet to incorporate with such record directional symbols indicative of the time when such record is made.

9. An apparatus for registering the time when record entries are made comprising a chronometrically controlled platen having directional markings thereon having like angular relation to a given base line, said platen being rotatable to vary the angular relation of said markings to said base line, and a record sheet adapted to bear upon said platen when a record is made on said sheet.

10. An apparatus for registering the time when record entries are made comprising a chronometrically controlled platen having directional markings thereon having like angular relation to a given base line, said platen being rotatable to vary the angular relation of said markings to said base line, and means for moving the record sheet over said platen in position to bear thereupon when a record is made on said sheet.

11. An apparatus for registering the time when record entries are made comprising a chronometrically controlled platen having directional markings thereon having like angular relation to a given base line, said platen being rotatable to vary the angular relation of said markings to said base line, means for moving the record sheet over said platen in position to bear thereupon when a record is made on said sheet, and an impression sheet interposed between said platen and said record sheet.

12. An apparatus comprising a suitable case, a chronometrically controlled platen mounted in said case, said platen having directional markings thereon having like angular relation to a given base line and being rotatable to vary the angular relation of said markings to said base line, and means in said case for moving a record sheet over said platen in a constant relation to said base line.

13. An apparatus comprising a suitable case, a chronometrically controlled platen mounted in said case, said platen having directional markings thereon having like angular relation to a given base line and being rotatable to vary the angular relation of said markings to said base line, reels in said case at opposite sides of said platen and means for rotating said reels, whereby a record sheet mounted on said reels may be moved over said platen.

HARRY L. THOMSON.